(12) United States Patent
Garcia et al.

(10) Patent No.: US 9,087,273 B2
(45) Date of Patent: Jul. 21, 2015

(54) FACIAL RECOGNITION USING SOCIAL NETWORKING INFORMATION

(75) Inventors: David Harry Garcia, Sunnyvale, CA (US); Luke St. Clair, Redmond, WA (US); Jenny Yuen, Cambridge, MA (US)

(73) Assignee: Facebook, Inc., Menlo Park, CA (US)

(*) Notice: Subject to any disclaimer, the term of this patent is extended or adjusted under 35 U.S.C. 154(b) by 47 days.

(21) Appl. No.: 13/297,074

(22) Filed: Nov. 15, 2011

(65) Prior Publication Data
US 2013/0121540 A1 May 16, 2013

(51) Int. Cl.
G06K 9/00 (2006.01)
G06K 9/72 (2006.01)

(52) U.S. Cl.
CPC .............. *G06K 9/72* (2013.01); *G06K 9/00288* (2013.01); *G06K 9/00677* (2013.01)

(58) Field of Classification Search
None
See application file for complete search history.

(56) References Cited

U.S. PATENT DOCUMENTS

| | | | |
|---|---|---|---|
| 8,041,082 B1* | 10/2011 | Baluja et al. | 382/118 |
| 8,064,656 B2* | 11/2011 | Fukushima et al. | 382/118 |
| 8,180,804 B1* | 5/2012 | Narayanan et al. | 707/798 |
| 2004/0008873 A1* | 1/2004 | Sogo et al. | 382/118 |
| 2005/0171955 A1* | 8/2005 | Hull et al. | 707/10 |
| 2005/0256756 A1* | 11/2005 | Lam et al. | 705/10 |
| 2006/0042483 A1* | 3/2006 | Work et al. | 101/91 |
| 2006/0251339 A1* | 11/2006 | Gokturk et al. | 382/305 |
| 2007/0177805 A1* | 8/2007 | Gallagher | 382/190 |
| 2008/0040475 A1* | 2/2008 | Bosworth et al. | 709/224 |
| 2008/0080743 A1* | 4/2008 | Schneiderman et al. | 382/118 |
| 2008/0080745 A1* | 4/2008 | Vanhoucke et al. | 382/118 |
| 2008/0288612 A1* | 11/2008 | Kwon | 709/220 |
| 2009/0074258 A1* | 3/2009 | Cotgreave | 382/118 |
| 2009/0119167 A1* | 5/2009 | Kendall et al. | 705/14 |
| 2009/0185723 A1* | 7/2009 | Kurtz et al. | 382/118 |
| 2010/0063993 A1* | 3/2010 | Higgins et al. | 709/203 |
| 2010/0076850 A1* | 3/2010 | Parekh et al. | 705/14.66 |
| 2010/0142762 A1* | 6/2010 | Morita | 382/115 |
| 2010/0172551 A1* | 7/2010 | Gilley et al. | 382/118 |
| 2010/0245567 A1* | 9/2010 | Krahnstoever et al. | 348/143 |
| 2010/0257023 A1* | 10/2010 | Kendall et al. | 705/10 |
| 2011/0038512 A1* | 2/2011 | Petrou et al. | 382/118 |
| 2011/0044512 A1* | 2/2011 | Bambha et al. | 382/118 |
| 2011/0129145 A1* | 6/2011 | Perlmutter et al. | 382/159 |

(Continued)

OTHER PUBLICATIONS

Stone, Zak, Todd Zickler, and Trevor Darrell. "Autotagging facebook: Social network context improves photo annotation." Computer Vision and Pattern Recognition Workshops, 2008. CVPRW'08. IEEE Computer Society Conference on. IEEE, 2008.*

*Primary Examiner* — Stephen R Koziol
*Assistant Examiner* — Sean Conner
(74) *Attorney, Agent, or Firm* — Baker Botts L.L.P.

(57) ABSTRACT

In particular embodiments, one or more images associated with a primary user are received. The image(s) may comprise single images, a series of related images, or video frames. In each image, one or more faces may be detected and/or tracked. For each face, one or more candidates are selected who may be identified with the face. Each candidate may be connected to the primary user within a social network. A candidate score for each candidate associated with a detected face. Finally, the winning candidate is determined, and a suggestion to identify the detected face as being the winning candidate is presented. Some embodiments may operate upon video clips as the video is captured by a mobile device. Some embodiments may operate upon series of images as they are uploaded to or viewed on a website.

20 Claims, 7 Drawing Sheets

(56) References Cited

U.S. PATENT DOCUMENTS

| | | | |
|---|---|---|---|
| 2011/0182482 A1* | 7/2011 | Winters et al. | 382/116 |
| 2011/0211737 A1* | 9/2011 | Krupka et al. | 382/118 |
| 2011/0235859 A1* | 9/2011 | Imoto | 382/103 |
| 2012/0039514 A1* | 2/2012 | Sun et al. | 382/118 |
| 2012/0076367 A1* | 3/2012 | Tseng | 382/118 |
| 2012/0110071 A1* | 5/2012 | Zhou et al. | 709/204 |
| 2012/0114199 A1* | 5/2012 | Panyam et al. | 382/118 |
| 2012/0166532 A1* | 6/2012 | Juan et al. | 709/204 |
| 2012/0321143 A1* | 12/2012 | Krupka et al. | 382/118 |
| 2013/0077833 A1* | 3/2013 | Kritt et al. | 382/118 |

* cited by examiner

FACIAL RECOGNITION USING SOCIAL NETWORKING INFORMATION

BACKGROUND

Social networks, or social utilities that track and enable connections between users (including people, businesses, and other entities), have become prevalent in recent years. In particular, social networking websites allow users to share and consume information more efficiently and in real-time. A social networking website may also allow users to associate themselves with other users, thus creating a web of connections among the users of the social networking website. These connections among the users can be leveraged by the website to offer more relevant information to each user in view of the users' shared information. Recognition of faces in images can be performed by any of a number of conventional methods. Such conventional methods for face recognition typically do not take advantage of the wealth of additional information available via social networks.

INTRODUCTION

The present disclosure relates generally to social networking websites and other systems in which users can form connections with other users, and, more specifically, relates to recognition of faces in video, photos, or other media hosted on the social network.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DESCRIPTION OF EXAMPLE EMBODIMENT(S)

Overview

Particular embodiments relate to a social networking environment including a social networking system and related systems that include conventional stationary as well as mobile embodiments. A social networking system offers its users the ability to communicate and interact with other users of the social networking system. Users join the social networking system and then add connections to a number of other users to whom they desire to be connected. Once they are members of the social network, the users may interact with the social network itself, by viewing and posting images and video on their own page, or by using mobile devices to view and post location-based social networking information.

In particular embodiments, a user may capture photos and/or video that includes real-time facial recognition with respect to the people in their social network. As each image in a video clip or a set of related images is processed, faces are detected and tracked. For a given face in an image, different potential candidates for identification of the face are selected (if available) from the user's social network. Each candidate for identification of the face in the image is scored, based on any number of factors, including but not limited to a confidence level, relationship coefficients with respect to the user and the candidate, physical proximity of the candidate to the user at the time the video and/or images were captured, etc. As the face is tracked through a series of images or video frames, the individual candidate scores in each image are computed and incorporated into an overall candidate score.

In one embodiment, as a user captures video or otherwise views their environment using their mobile device, facial recognition is performed in real-time, to provide identification suggestions for any detected faces in the video which may correspond to friends in the user's social network. In one embodiment, when a user views previously captured video on a computing device, facial recognition is performed in real-time, as the video is played, to provide identification suggestions for any detected faces in the video which may correspond to friends in the user's social network. Some embodiments perform real-time facial recognition for conventional photographs, including, for example, a series of related photographs. In some embodiments, an identification suggestion is not provided unless a face is detected in a minimum threshold number of images and/or video frames. Other embodiments are readily envisioned by the disclosure and are described in detail below.

Figure 1:
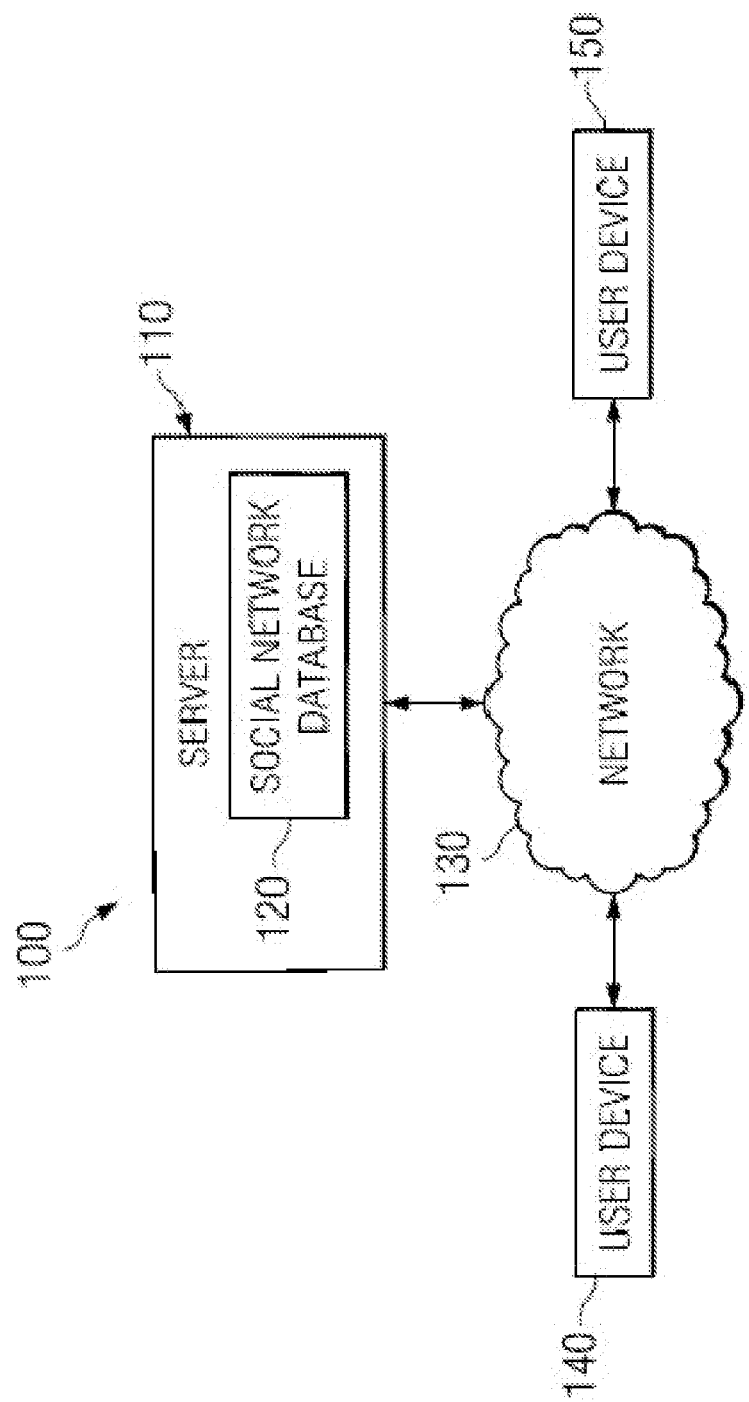
FIG. 1 illustrates the architecture of an example social network.

FIG. 1 illustrates an exemplary environment 100 in which facial recognition for images and/or video may be implemented in association with a social network. Environment 100 comprises a server 110, a network 130, and user devices 140 and 150. A social network data store 120 is either located on or accessible from the server 110. The server 110 monitors user activity and performs facial recognition when images and/or video are captured. The data store 120 stores user information that is accessed by users of the social network. The server 110 and the database 120 are discussed further herein. The network 130 provides the medium for communication between the server 110 and user devices 140 and 150. The network 130 may be the Internet, a wireless or wired network such as a mobile device carrier network, or any other network that can be used for communication between a server and a client.

In one embodiment, the user device 140 is used by a user initiating the actions being monitored by the server 110. The user device 150 is used by a recipient of the monitored actions. User devices 140 and 150 may each be any suitable computing device, such as a desktop computer, or a mobile device, e.g., a mobile phone, a cell phone, a smart phone, a personal digital assistant, a notebook computer, a tablet computer, a laptop computer, a camera, a video camera, or a hand-held game console.

Figure 2:
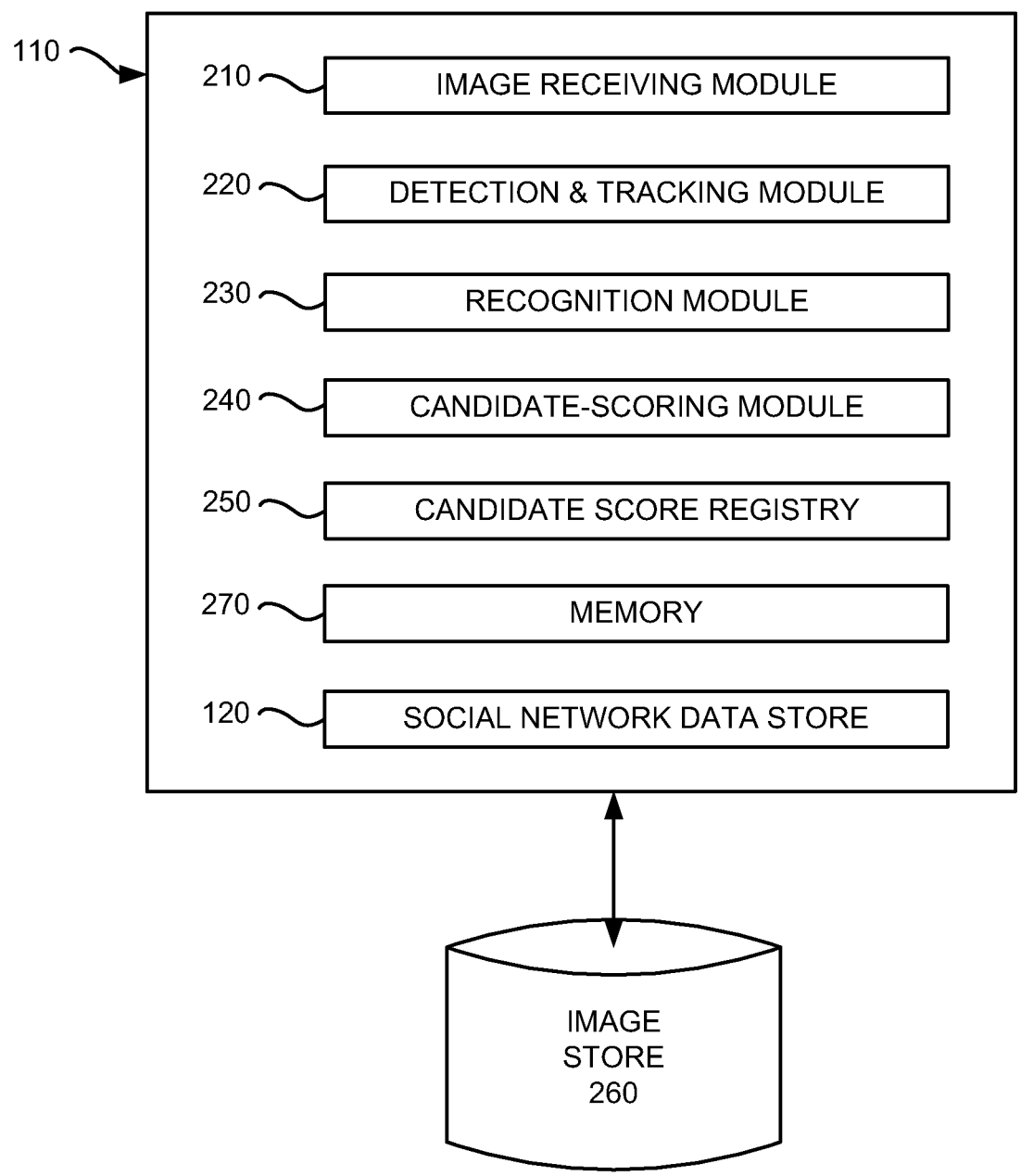
FIG. 2 illustrates an example server that may be used to perform face recognition and candidate scoring for images in association with a social network.

FIG. 2 illustrates an example embodiment of the architecture of a server 110 that may be used to perform face recognition and candidate scoring for images in association with a social network. In some embodiments, the server 110 comprises an image receiving module 210. Image receiving module 210 may receive images from video clips, digital or digitized photographs, and/or other images that were captured, uploaded, and/or streamed by or are otherwise attributable to a primary user. In some embodiments, image receiving module 210 may store the images as it is captured, uploaded, and/or streamed.

In some embodiments, the server 110 comprises a face detection and tracking module 220 that operates upon images received by image receiving module 210 to detect and/or track faces in the images. Any conventional technology may be used for detection of faces in images and tracking of faces in series of images, such as video clips. Face detection and tracking module 220 may perform detection and tracking of faces itself, or it may be an interface that interacts with another server or a third-party service that performs those functions.

In some embodiments, the server 110 comprises a recognition module 230 that operates upon faces detected by face detection and tracking module 220 to select candidates for identification of the faces. Any conventional technology may be used for recognition of faces in images. In some embodiments, the pool of users from which candidates are selected comprises the set of users of a social network who are connected to the primary user. In some embodiments, the pool of users from which candidates are selected comprises the set of users of a social network who have some affinity with the primary user (e.g., belonging to a certain group, sharing a hobby/interests, or matriculating from the same school). In some embodiments, the pool of users from which candidates are selected may also include public figures, celebrities, and/or other well-known people. Recognition module 230 may perform face recognition itself, or it may be an interface that interacts with another server or a third-party service that performs those functions. In some embodiments, face detection and tracking module 220 and recognition module 230 may comprise a single interface that interacts with another server or a third-party service that performs all of those functions.

Server 110 may also comprise a candidate-scoring module 240. Candidate-scoring module 240 scores the candidates selected by recognition module 230, based on an algorithm that incorporates any of one or more factors. In some embodiments, the algorithm for candidate-scoring module 240 incorporates social-networking information (e.g., user identity and profile, degree of separation, relationship coefficients with the primary user) for each candidate who is connected to the primary user within a social network.

Coefficient scores may be calculated based on any number of variables. For example, increased interaction between any two users may result in a higher coefficient score, lending to the inference that the two are closer real-world friends. Similarly, a large number of mutual friends may increase the coefficient score. Methods for calculating coefficient scores between two or more users are well-known. Regardless of how the coefficient scores are calculated, once candidate-scoring module 240 obtains coefficient scores between the primary user and each of the candidates, candidate-scoring module 240 may incorporate the coefficient scores into the algorithm. For example, a candidate with a coefficient score above a minimum threshold, indicating that the users are close friends in real-life, is more likely to be in the same photo as the primary user. In some embodiments, coefficient information is retrieved only for candidates within a maximum threshold for degrees of separation from the primary user. In some embodiments, information is retrieved only for candidates having certain relationship coefficients with the primary user. Further description of relationship coefficients can be found in U.S. patent application Ser. No. 12/978,265, filed 23 Dec. 2010, titled "Contextually Relevant Affinity Prediction in a Social Networking System," the contents of which are hereby incorporated by reference in its entirety.

In some embodiments, candidate-scoring module 240 may incorporate other information from recognition module 230, such as, for example, a confidence level that quantifies the level of confidence with which each candidate was selected as a possible identification of a given detected face. In some embodiments, social-networking information is only retrieved for those candidates selected with a minimum confidence level. In some embodiments, where the confidence level for a particular candidate selection is above a certain threshold (e.g., 0.55), that candidate's score is increased by a particular factor (e.g., a confidence level of 0.55 is increased to 0.70).

In some embodiments, server 110 may also comprise a candidate score registry 250. Candidate score registry 250 may be used by candidate-scoring module 230 to keep track of scores for each candidate. In some embodiments, the algorithm for candidate-scoring module 240 determines individual image scores for each face detected in an image—such individual image scores may be stored in candidate score registry 250. For series of images, such as frames of a video clip, or a series of still photographs all taken around the same time or approximately at the same location, candidate score registry 250 may store not only individual image scores, but also an overall score for each candidate with respect to all images in which the associated detected face appears. In some embodiments, the algorithm for candidate-scoring module 240 is based on a hidden Markov model.

In some embodiments, server 110 also comprises the social network data store 120; in some embodiments, server 110 is communicably connected to social network data store 120 and has access to profile information and relationship information associated with the primary user. Server 110 may also include or have access to an image store 260 that stores images with faces for which an identification has been confirmed (e.g., tag suggestion was confirmed). In some embodiments, server 110 is trained using machine learning techniques and images from image store 260 to accurately recognize faces and/or accurately score candidates for a detected face.

The server 110 may include a memory 270 to store applications, modules, user data, and/or other information. In some embodiments, applications, modules, and/or data store 120 may reside in memory on several servers (not shown).

Figure 3:
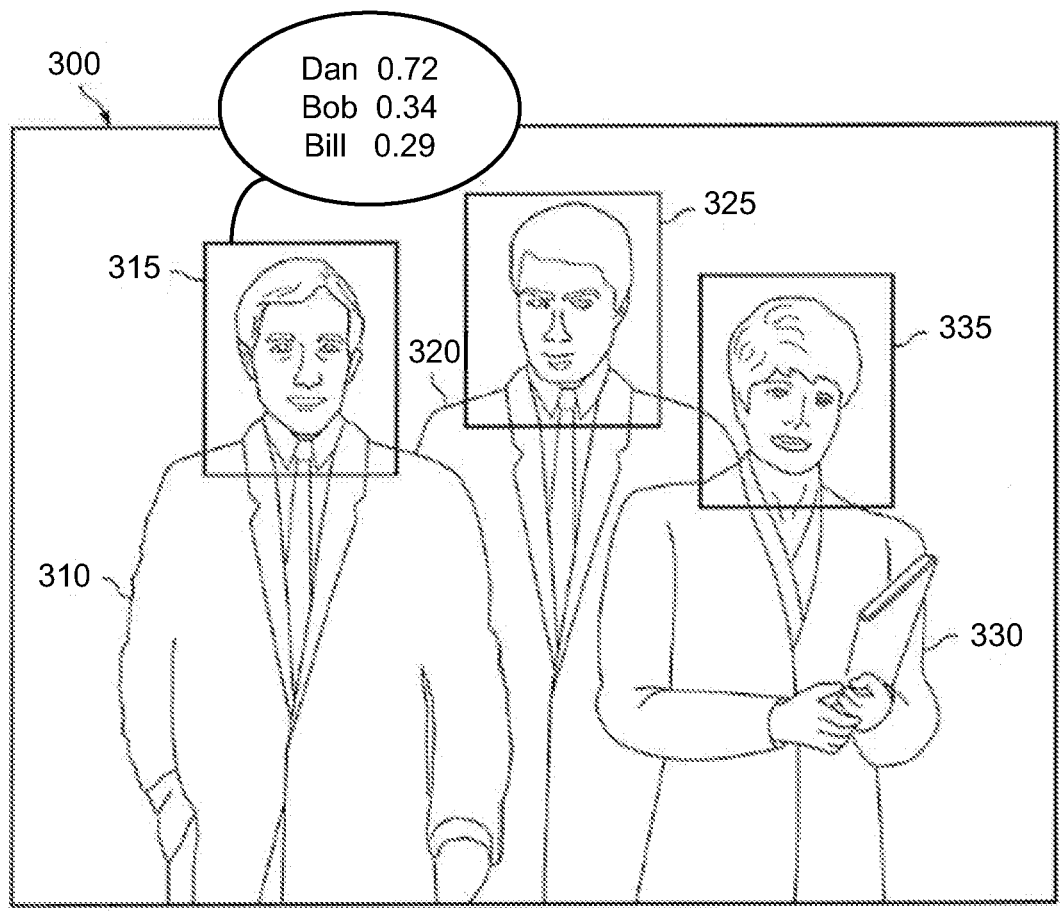
FIG. 3 illustrates an example of an image in which candidates have been selected for a face detected in the image.

FIG. 3 illustrates an image 300 captured by a primary user, upon which face recognition was performed in an example embodiment. In some embodiments, image 300 comprises a photo. In some embodiments, image 300 comprises a frame of video clip. In example image 300, faces were detected for three individuals 310, 320, and 330. For each of the three individuals 310, 320, and 330, face detection was successfully performed to detect faces in regions 315, 325, and 335 respectively, in image 300.

In one example embodiment, candidates for the face detected in region 315 of image 300 are recognized and selected (the candidates having been selected from a pool of users connected to the primary user in the social network within a minimum degree of separation). In some embodiments, the number of candidates selected is limited to a maximum threshold number of candidates. Scores are then determined for the three candidates "Dan," "Bob," and "Bill" according to a candidate-scoring algorithm. As illustrated in FIG. 3, a score of 0.72 was determined for candidate "Dan"—the candidate-scoring algorithm may determine the score based on a number of factors, such as, for example, a confidence level determined in relation to the face recognition and candidate selection, relationship coefficients as between candidate "Dan" and the primary user, and other relevant factors.

The winning-candidate algorithm for determining whether candidate "Dan" is the winner for identification of the face detected in region 315 may also take into account other factors, such as: (1) whether "Dan" was determined to be in close physical proximity to the primary user at the time the image was captured, (2) for a related series of images, such as a number of high-speed still photos taken at the same location or frames in a video of a scene, whether "Dan" was the winning candidate in the last N of M images, where N is a minimum threshold number of images and M comprises all or some subset of the series of related images, (3) relationship coefficients as between candidate "Dan" and the primary user, and (4) other relevant factors. In some embodiments, for example, for a series of related images, a winning candidate for a detected face is not determined unless the detected face appears in and is determined to be the winning candidate in the last N of M images.

In some embodiments, "older" or less recent candidate scores may expire. For example, if "Dan" is determined to be the winning candidate for a given face detected in video frames 1-5, 44-67, and 70-72, the face that "Dan" won in frames 1-5 may be disregarded when evaluating the winning candidate for frames 77-90.

In some embodiments, for a series of related images, once the same winning candidate for a detected face has been selected for the last P of Q images, any subsequent image in the series of related images including the same detected face is presumed to be the same winning candidate, where P is a maximum threshold number of images and Q comprises all or some subset of the series of related images.

In some embodiments, the functionality of candidate-scoring algorithm and the functionality of winning-candidate algorithm may be integrated into or operate as a single process.

Figure 4A:
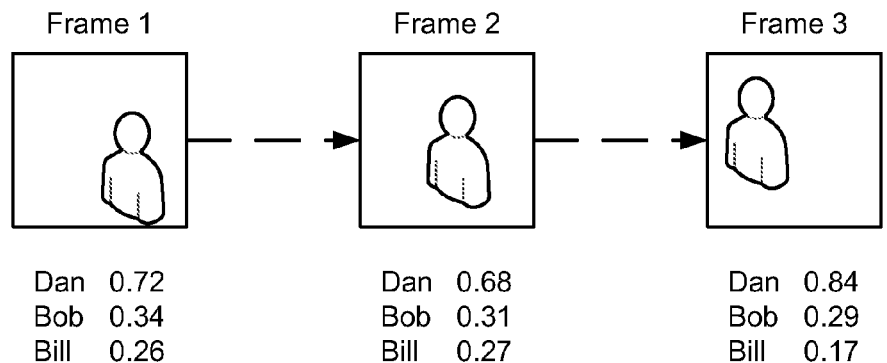
FIG. 4A illustrates candidate scoring in an example embodiment over a series of frames from a video clip.

FIG. 4A illustrates an example of candidate scoring in individual images from a series of related images in an example embodiment over a series of three frames from a video clip. As shown in the example, in each frame, a set of three candidates ("Dan," "Bob," and "Bill") have been selected and scored. In the example, the same three candidates were selected in each of the three frames, however, some embodiments may allow different sets of candidates and different numbers of candidates to be selected for images in a series of related images. In Frame 1, the score for candidate "Dan" is 0.72. The score for candidate "Dan" drops to 0.68 for Frame 2, but rises to 0.84 for Frame 3. In some embodiments, these fluctuations in a candidate's score between images in a series of related images may be based upon the factors discussed above. In some embodiments, the candidate-scoring algorithm may also factor in the candidate's scores from prior images in the series of related images; in some embodiments, the candidate-scoring algorithm may only factor in the candidate score determined in the immediately-preceding image in the series of related images.

Figure 4B:
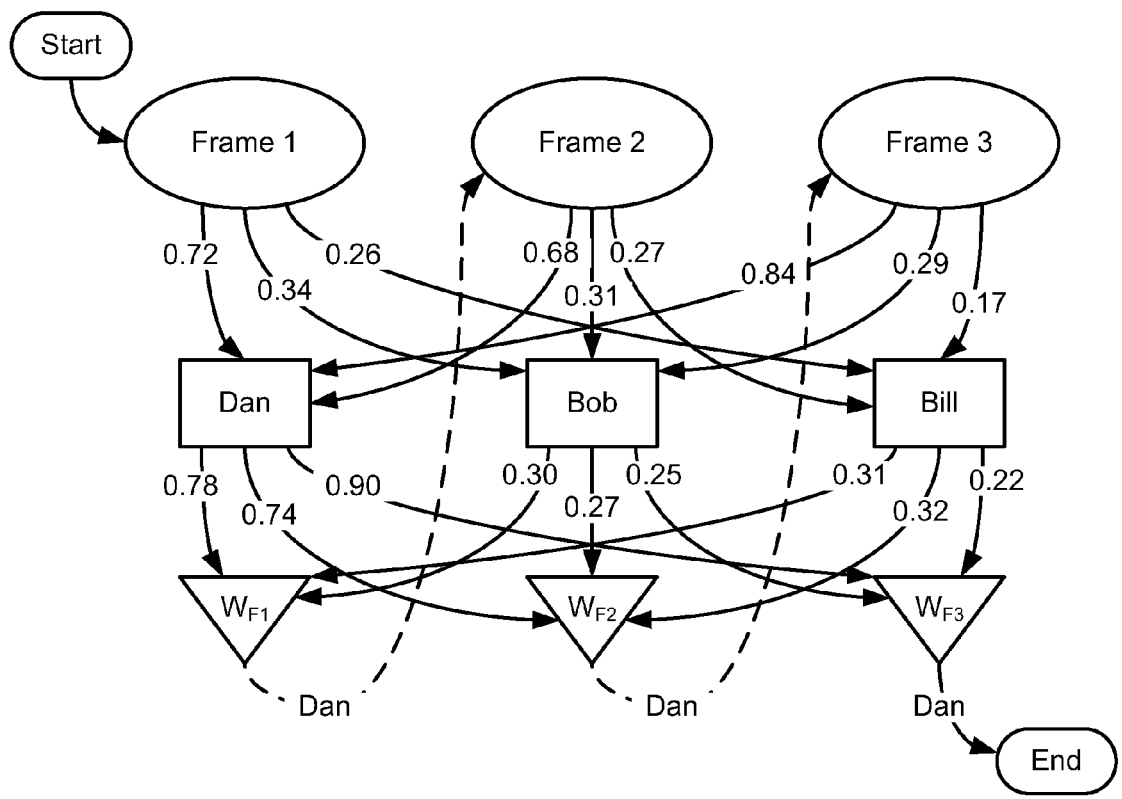
FIG. 4B illustrates a diagram for an example embodiment based on a hidden Markov model.

FIG. 4B illustrates a diagram for an example embodiment based on a hidden Markov model. As shown in the example in FIG. 4B, Frame 1 is processed first: a face is detected and candidates "Dan," "Bob," and "Bill" are selected and scored. As shown, the candidate-scoring algorithm produces image-based candidate scores for Frame 1: 0.72 for candidate "Dan," 0.34 for candidate "Bob," and 0.26 for candidate "Bill." The winning-candidate algorithm then applies additional factors and determines the winning candidate for the detected face in Frame 1 ($W_{F1}$) as "Dan" (with a winning candidate score of 0.78). In some embodiments, the winning candidate for each image is stored in candidate score registry 250. In some embodiments, the determination of "Dan" as the winning candidate for identification of the detected face in Frame 1 is incorporated into the candidate scoring algorithm as applied to Frame 2.

In some embodiments, after analyzing candidates for the detected face in all three frames, "Dan" is selected as the final winning candidate with respect to all images in the series. In some embodiments, where the winning candidate of the previous image is selected as a candidate for the current image, the candidate-scoring algorithm increases the score of the candidate with respect to the current image. In some embodiments, the final winning candidate is determined by storing each candidate's score for each image in a series of related images and then determining the sum for each candidate of all of their image-based scores. In some embodiments, the final winning candidate is determined by using a hidden Markov model or any other similar algorithm.

In some embodiments, known series of related images with previously-identified faces may be used to train the recognition module and/or the candidate-scoring algorithm and/or the winning-candidate algorithm.

Figure 5:
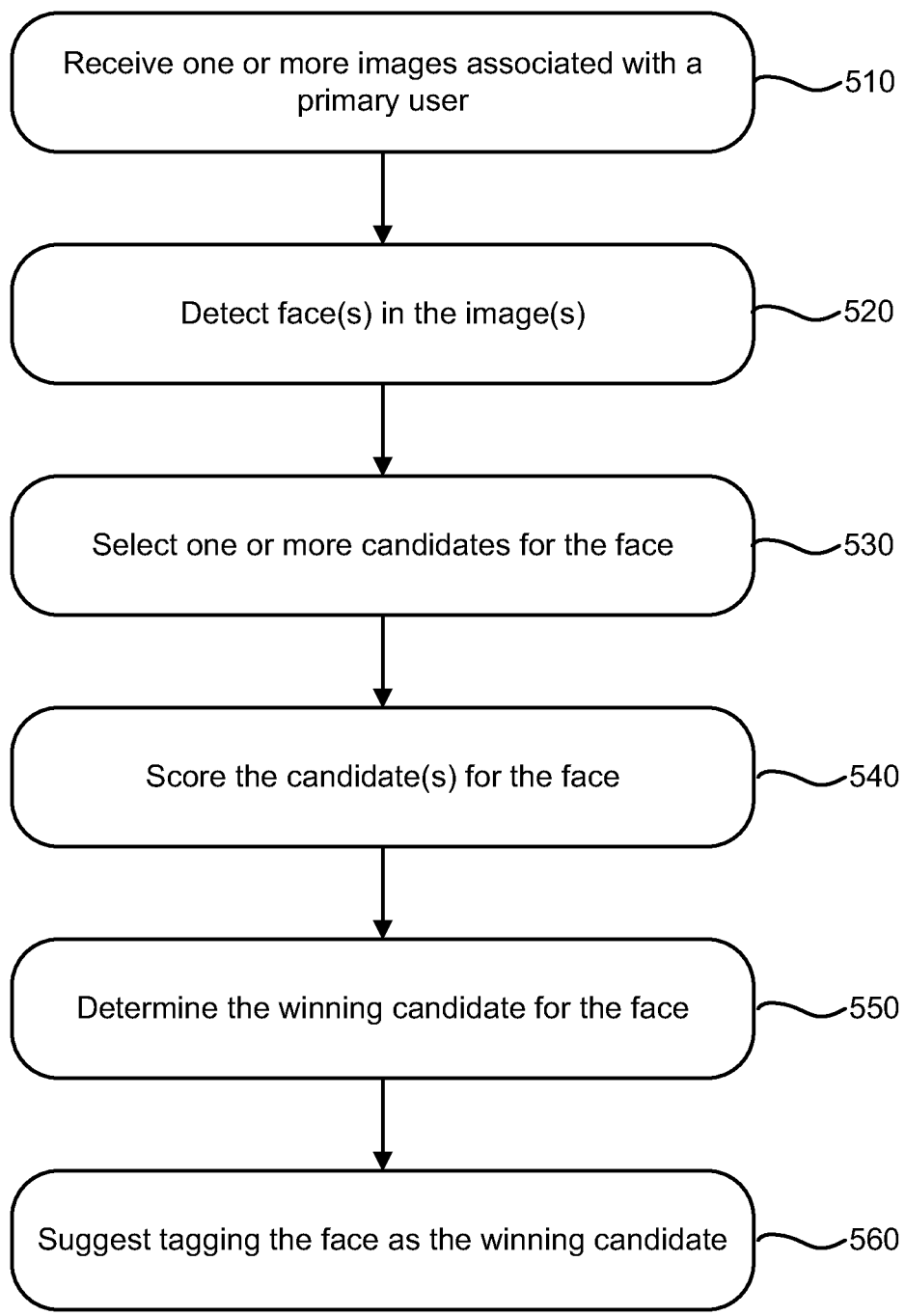
FIG. 5 illustrates a process flow of an example embodiment for performing facial recognition.

FIG. 5 illustrates an example method of performing facial recognition according to one or more embodiments. A set of one or more images associated with a primary user is received or retrieved (510). One or more faces are detected in the one or more images (520). If the one or more images comprise a series of related images, each detected face may be tracked throughout the series of related images. For each detected face in each image, a set of one or more candidates who may be identified with a face is selected (530). A candidate score for each candidate associated with the face is determined (540). In some embodiments, each candidate's score is determined in real-time as image 300 is displayed, uploaded, captured, and/or streamed. The winning candidate of all candidates associated with the face is then determined (560). Finally, a suggestion to tag, confirm, or otherwise permanently identify the face as being the winning candidate is presented (570). In some embodiments, the winning candidate is determined in real-time and the identification and/or suggestion is presented in association with image 300. In some embodiments, the highest-scoring candidates are presented in association with image 300, along with options to tag, confirm, or otherwise permanently identify one of the highest-scoring candidates as the correct identity for the detected face.

Figure 6:
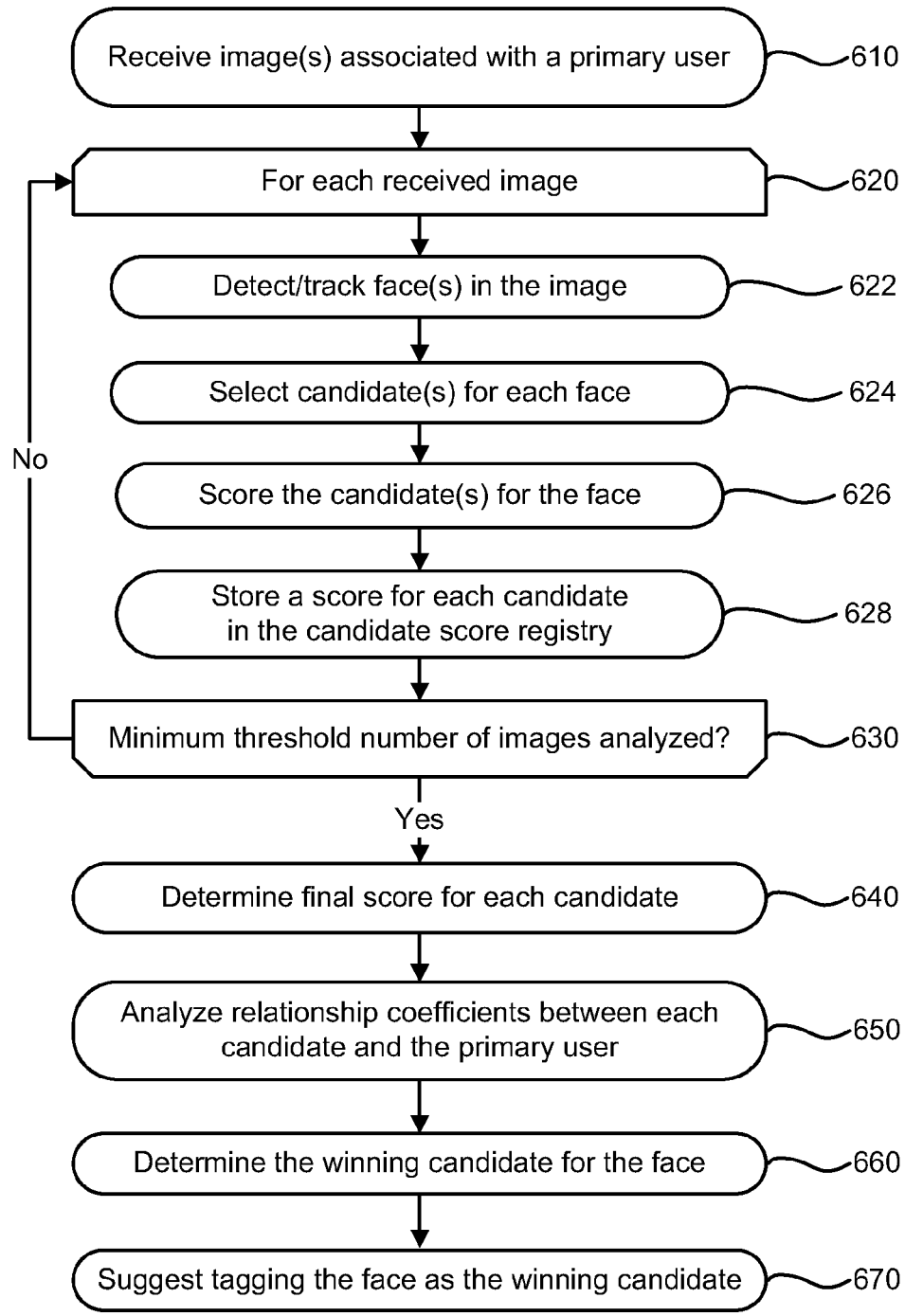
FIG. 6 illustrates a process flow of an example embodiment for performing facial recognition using a video clip.

FIG. 6 illustrates an example method of performing facial recognition within a video clip being captured on a mobile device. Images (i.e., video frames) associated with a primary user are received on the mobile device as they are captured by a camera built into the mobile device (610). For each image in the set of related images (620), one or more faces are detected and/or tracked in the set of related images (622). For each detected face in each image, a set of one or more candidates who may be identified with a face is selected (624). A candidate score for each candidate associated with the face is determined (626). The candidate scores for the candidates are then stored in the candidate score registry (628). If a minimum threshold number of images including the detected face have been analyzed (630), a final score for each candidate is calculated to determine the winning candidate (640). Relationship coefficients between each candidate and the primary user are applied to modify candidate scores, eliminate candidates, etc. Finally, the winning candidate for the face is determined (660), and a suggestion to tag, confirm, or otherwise permanently identify the face as being the winning candidate is presented (670). In some embodiments, any such suggestion is not presented unless a minimum threshold number of images including the detected face have been analyzed.

In particular embodiments, the methods illustrated in FIGS. 5 and 6 may be performed using a system incorporating the server described in FIG. 2. In particular embodiments, the methods illustrated in FIGS. 5 and 6 may be entirely performed using a mobile device.

Figure 7:
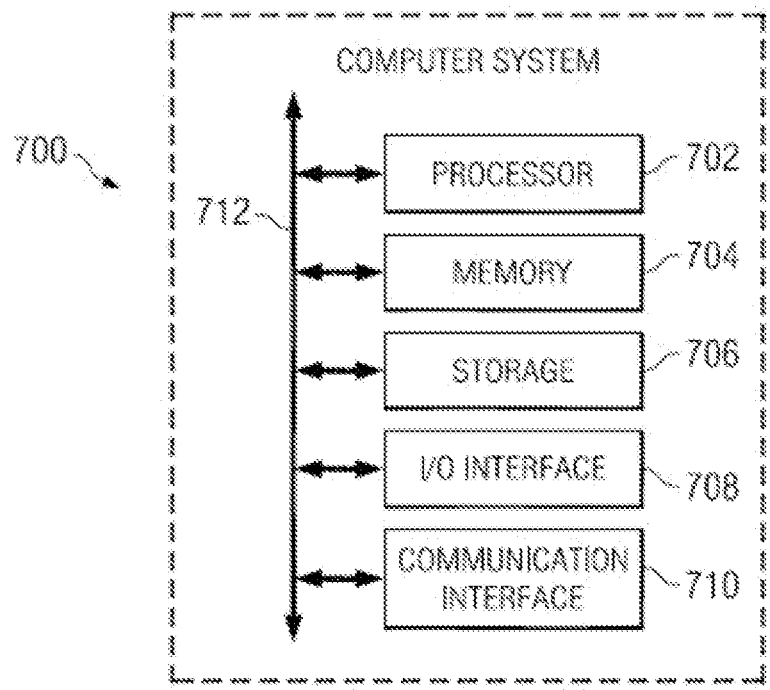
FIG. 7 illustrates an example computer system for perfoming particular embodiments.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 02 to memory 704. Bus 712 may include one or more memory buses, as described below. In particular embodiments, one or more memory management units (MMUs) reside between processor 702 and memory 704 and facilitate accesses to memory 704 requested by processor 702. Although this disclosure describes and illustrates particular memory, this disclosure contemplates any suitable memory.

In particular embodiments, storage 706 includes mass storage for data or instructions. Storage 706 may include removable or non-removable (i.e., fixed) media, where appropriate. Storage 706 may be internal or external to computer system 700, where appropriate. In particular embodiments, storage 706 is non-volatile, solid-state memory. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 710 for it. Although this disclosure describes and illustrates a particular communication interface, this disclosure contemplates any suitable communication interface.

In particular embodiments, bus 712 includes hardware, software, or both coupling components of computer system 700 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   by one or more computing devices, receiving a set of related images associated with a primary user, wherein a face appears in each of the related images;
   by one or more computing devices, selecting one or more candidates who may be identified with the at least one face, wherein each of the candidates is a user of a social network, and wherein for each of the candidates a computed measure of affinity of the primary user's interest in the candidate exceeds a threshold, and wherein the measure of affinity for each of the candidates is computed based on a predictor function;
   by one or more computing devices, for each of the related images, determining a candidate score for each of the candidates, wherein the candidate score for a particular candidate represents a likelihood that the particular candidate corresponds to the face, the candidate score being based at least in part on:
      the computed measure of affinity for the particular candidate; and
      a facial recognition comparison of the particular candidate to the face;
   by one or more computing devices, for each of the candidates, determining a facial-recognition score, wherein a facial-recognition score for a particular candidate is based on an aggregate value of a plurality of candidate scores for the particular candidate; and
   by one or more computing devices, determining a winning candidate to identify the face based on the facial-recognition scores,
   wherein the particular candidate is determined to be the winning candidate for a particular image among the plurality of images only when the particular candidate has been determined to be a winning candidate in at least a minimum number of images preceding the particular image in the set of related images.

2. The method of claim 1, wherein the one or more candidates are limited to a maximum number of candidates.

3. The method of claim 1, wherein determining that each image of the set of related images is determined to be related to the other images of the set of related images is based at least in part on comparing:
   a location of the each image and a location of the other images; or
   a time of the each image and a time of the other images.

4. The method of claim 1, wherein the facial-recognition score is determined only after a minimum threshold number of candidate scores have been determined for each of the candidates.

5. The method of claim 1, wherein determining the winning candidate comprises determining the aggregate candidate score for the candidate for a subset of the related images.

6. The method of claim 1, further comprising storing each candidate score for a particular candidate in a data store.

7. The method of claim 1, further comprising presenting an identification of the face as the winning candidate in every image of the set of images where the face appears.

8. The method of claim 1, further comprising presenting options to a user to select one of a set of highest-scoring candidates to identify the face in every image of the set of related images where the face appears.

9. The method of claim 1, wherein a substantial portion of a single scene is depicted in each of the set of related images.

10. The method of claim 1, wherein the set of related images comprise frames from a video clip.

11. The method of claim 10, further comprising tracking the face as it appears in two or more frames of the video clip.

12. The method of claim 1, wherein selecting a candidate who may be identified with the at least one face comprises determining a confidence level for the candidate, and wherein determining the candidate score for a candidate comprises determining the candidate score based on the confidence level for the candidate.

13. The method of claim 12, wherein determining the candidate score for a candidate comprises determining the candidate score based on a minimum threshold confidence level for the candidate.

14. The method of claim 1, wherein determining the winning candidate comprises determining the winning candidate based on coefficients of a relationship between the candidate and the primary user.

15. The method of claim 1, wherein the aggregate value of a plurality of candidate scores comprises using a hidden Markov model.

16. A face recognition server, comprising:
   a processor; and a non-transitory machine-readable medium configured with instructions to be executed by the processor to:
      receive a set of related images captured by a mobile device, wherein:
         the set of related images are associated with a primary user; and
         a face appears in each of the related images;
      select one or more candidates who may be identified with the at least one face, wherein each of the candidates is a user of a social network, and wherein for each of the candidates a computed measure of affinity of the primary user's interest in the candidate exceeds a threshold, and wherein the measure of affinity for each of the candidates is computed based on a predictor function;
      for each of the related images, determine a candidate score for each of the candidates, wherein the candidate score for a particular candidate represents a likelihood that the particular candidate corresponds to the face, the candidate score being based at least in part on:

the computed measure of affinity for the particular candidate; and a facial recognition comparison of the particular candidate to the at least one face;

for each of the candidates, determine a facial-recognition score, wherein a facial-recognition score for a particular candidate is based on an aggregate value of a plurality of candidate scores for the particular candidate;

determine one or more winning candidates based on the facial-recognition scores; and send information to present an identification of the one or more winning candidates, wherein the information is presented in real time in association with the one or more images, wherein the particular candidate is determined to be the winning candidate for a particular image among the plurality of images only when the particular candidate has been determined to be a winning candidate in at least a minimum number of images preceding the particular image in the set of related images.

17. A mobile device associated with a primary user, comprising:

a camera;

a screen;

a non-transitory machine-readable storage medium; and a processor configured with instructions to:

receive a set of related images captured by a mobile device, wherein:

the set of related images are associated with a primary user; and a face appears in each of the related images;

access information associated with a plurality of users of a social network, wherein each of the users of the social network is connected to the primary user within the social network;

select one or more candidates who may be identified with the at least one face, wherein each of the candidates corresponds to one of the users of the social network, and wherein for each of the candidates a computed measure of affinity of the primary user's interest in the candidate exceeds a threshold, and wherein the measure of affinity for each of the candidates is computed based on a predictor function;

for each of the related images, determine a candidate score for each of the candidates, wherein the candidate score for a particular candidate represents a likelihood that the particular candidate corresponds to the face, the candidate score being based at least in part on:

the computed measure of affinity for the particular candidate; and a facial recognition comparison of the particular candidate to the at least one face;

for each of the candidates, determine a facial-recognition score, wherein a facial-recognition score for a particular candidate is based on an aggregate value of a plurality of candidate scores for the particular candidate;

determine one or more winning candidates based on the facial-recognition scores; and display on the screen information to the at least one face with the one or more winning candidates, wherein the particular candidate is determined to be the winning candidate for a particular image among the plurality of images only when the particular candidate has been determined to be a winning candidate in at least a minimum number of images preceding the particular image in the set of related images.

18. The method of claim 1, wherein the predictor function comprises a weighted set of one or more predictor functions.

19. The face recognition server of claim 16, wherein the predictor function comprises a weighted set of one or more predictor functions.

20. The mobile device of claim 17, wherein the predictor function comprises a weighted set of one or more predictor functions.

* * * * *